United States Patent
Mueller et al.

[11] Patent Number: 5,961,854
[45] Date of Patent: Oct. 5, 1999

[54] ELECTRODE FOR RESISTANCE SPOT WELDING OF ALUMINUM SHEET

[75] Inventors: Dietmar Mueller, Schwarzenffeld/Traunricht; Nikolaus Gschossmann, Uebersee; Norbert Donath, Poecking; Franz Schubert, Poing, all of Germany

[73] Assignee: Bayerische Motoren Werke Aktiengesellschaft, Germany

[21] Appl. No.: 08/929,802

[22] Filed: Sep. 15, 1997

[30] Foreign Application Priority Data

Sep. 13, 1996 [DE] Germany .......................... 196 37 410

[51] Int. Cl.⁶ .................................................. B23K 11/30
[52] U.S. Cl. .......................................... 219/119; 219/86.1
[58] Field of Search ................... 219/86.1, 117.1, 219/118, 119, 120

[56] References Cited

U.S. PATENT DOCUMENTS

| | | | |
|---|---|---|---|
| 3,363,086 | 1/1968 | Ecklund et al. | 219/119 |
| 4,859,825 | 8/1989 | Polvara et al. | 219/119 |
| 5,844,194 | 12/1998 | Kuwabara et al. | 219/119 |

FOREIGN PATENT DOCUMENTS

| | | |
|---|---|---|
| 0 103243A1 | 9/1983 | European Pat. Off. . |
| 3024079 | 1/1982 | Germany ................................. 219/119 |
| 44 16 504 A1 | 11/1995 | Germany . |
| 195 20 514 A1 | 12/1996 | Germany . |
| 59-174284 | 2/1984 | Japan . |
| 60-121083 | 6/1985 | Japan . |
| 5-228642 | 9/1993 | Japan ..................................... 219/119 |

OTHER PUBLICATIONS

"Wekstoffe für Elektroden und andere stromführende Teile an Widerstands–Schweisseinrichtungen" DIN 44 759 Nov. 1973.

*Primary Examiner*—Gregory Mills
*Attorney, Agent, or Firm*—Evenson, McKeown, Edwards & Lenahan, P.L.L.C.

[57] ABSTRACT

For welding conductive materials, using conventional copper electrode caps, with a long service life of the welding tool, a foil section is provided between the electrode cap and the surface of the sheet. The foil section is part of a foil strip which is displaceable relative to the electrode cap, and consists of a material with a high nickel content, while silver or a silver metal oxide is provided as a material in the contact area between the electrode cap and the foil section. The electrode cap is preferably coated with this material.

12 Claims, 1 Drawing Sheet

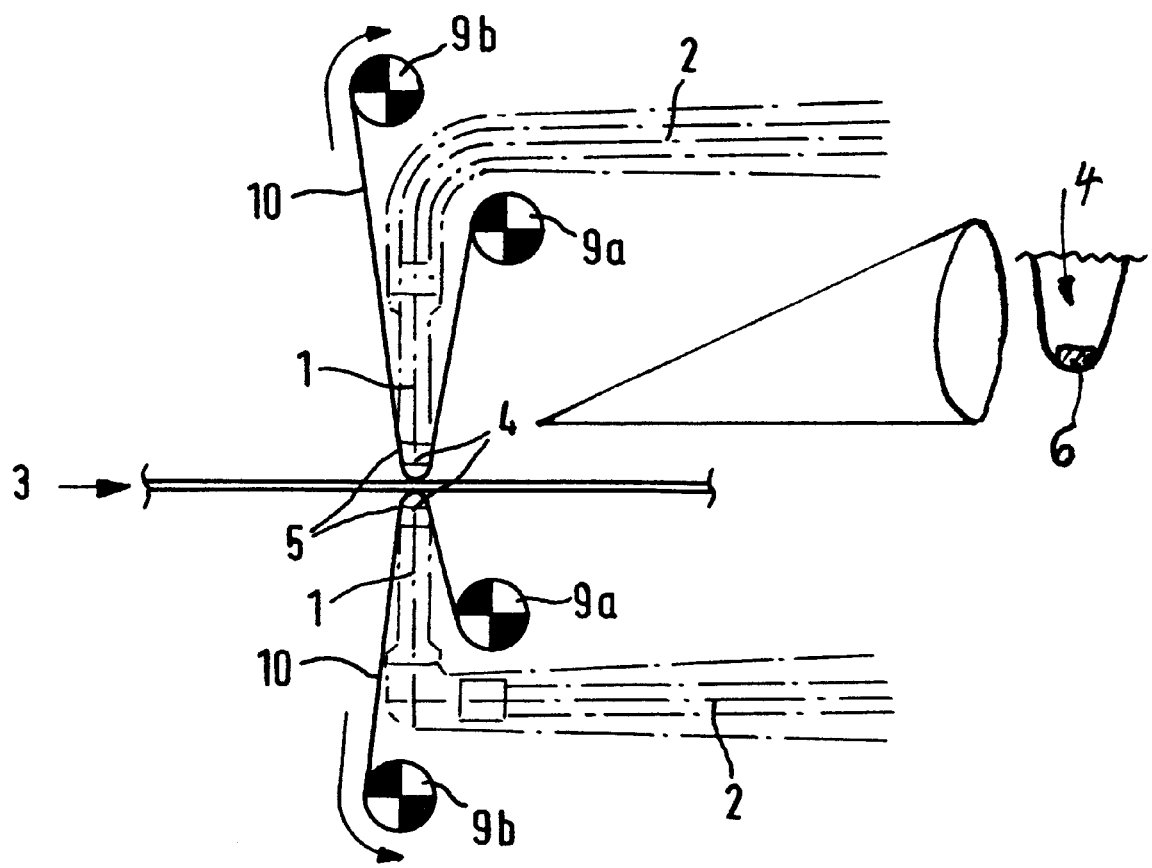

ELECTRODE FOR RESISTANCE SPOT WELDING OF ALUMINUM SHEET

BACKGROUND AND SUMMARY OF THE INVENTION

This application claims the priority of Germany Application No. 19637410.3-34, filed Sep. 13, 1996, the disclosure of which is expressly incorporated by reference herein.

The invention relates to a device for resistance spot welding of sheets or shapes of a material which is a good conductor of electricity and heat (especially aluminum, magnesium or copper), with a displaceable foil section provided between an electrode cap of the welding electrode and the surface of the shape or the sheet (especially aluminum sheet).

The term "shape" is intended to include extrusion-molded shapes that can be welded by spot welding electrodes, as well as filigree-cast thin-walled parts made of such materials.

When conventional aluminum sheets are welded, an oxide layer can be located on the surface of the sheets, and can also be removed for example by pickling or grinding. The term "conventional aluminum sheet" is intended to include sheets with conventional coatings, for example a titanium-zirconium coating. The basic material of the sheets can be in the 5 series or the 6 series, in other words it can be AlMg3 to AlMg5 (international conventional designation: 5182) or it can be AlMg0.4 Si 1,2 (international conventional designation: 6016).

In addition to aluminum sheets, which are known to have relatively high electrical conductivity as well as relatively high thermal conductivity, the electrode of the present invention is especially well suited for welding sheets or filigree shapes made of other materials which are likewise marked by relatively high conductivity. In addition to aluminum-coated steel sheets, examples of other such materials are copper (especially silver-coated copper) and magnesium. In addition, a casting skin can occur on the surfaces of shapes that are cast primarily from these materials; such skin, however, is removable by grinding as well.

German patent document DE 44 16 504 A1 describes a welding arrangement in which the foil section (preferably a component of a foil strip) protects the electrode during welding of aluminum sheets against pickup of aluminum.

As is known, during welding, molten material can be seen spraying out at the contact area between the welding electrode and the aluminum sheet, which causes mixed crystal formation between the copper part of the welding electrodes and the aluminum. This in turn results in the deposition of electrode material on the sheet surface, and also of sheet material on the electrode. The latter phenomenon is referred to as pickup.

When welding aluminum sheets with conventional electrode caps made of copper alloys, such pickup is known to damage the electrode surface, shortening its lifetime and weakening the spot weld to the point that it is no longer sufficient. It also can cause the electrodes to stick together and even damaging the surface of the sheet.

By providing a foil section made of a material that is a good conductor of both electricity and heat between the electrode cap and the surface of the sheet, (and replacing it after one or more spot welds), such pickup on the electrode cap can be prevented, thereby considerably increasing its lifetime. As indicated in the abovementioned document, the foil section can be replaced especially simply if it is part of a foil strip unwound from a coil, stretched across the electrode, and guided for example to a second coil, so that it can be advanced periodically as the foil section abutting the electrode cap wears away.

However, in tests of welding of ordinary aluminum sheet using obvious and conventional materials for the foil strip, adhesion was observed either between the foil section and the electrode cap or between the foil section and the aluminum sheet. These adhesion effects are disadvantageous however since they either negatively influence the quality of the spot weld, or in the worst case actually prevent the foil strip from being advanced relative to the electrode cap.

In addition, such adhesion effects have also been observed in the welding of sheets, or especially precision-cast filigree shapes, composed of the other materials mentioned above.

The object of the present invention, therefore, is to provide a welding arrangement with which not only conventional aluminum sheet in particular, but also sheet or spot-weldable shapes made of other materials that are particularly good conductors, can be resistance-spot-welded, with interposition of a foil section that can be advanced relative to the electrode cap when signs of wear appear.

This object is achieved according to the invention by providing a foil section which consist of a material with a high nickel content, and either coating the electrode cap (which consists primarily of a copper alloy) with silver or a silver metal oxide or providing it with an insert made of silver or a silver metal oxide that comes in contact with the foil section. In particular, the electrode cap can be hard-silvered.

Other objects, advantages and novel features of the present invention will become apparent from the following detailed description of the invention when considered in conjunction with the accompanying drawings.

BRIEF DESCRIPTION OF THE DRAWINGS

The FIGURE shows electrodes according to the invention, each with a foil strip or a foil section for welding aluminum sheet.

DETAILED DESCRIPTION OF THE DRAWINGS

As shown in the FIGURE, the two electrodes 1 of a resistance spot-welding device (spot-welding tongs for example) are fastened as usual to the two sleeves 2 of the tongs, which are not shown in greater detail. These spot-welding tongs are intended to be used for welding two aluminum sheets 3 lying on top of one another in the usual fashion. In other words the two aluminum sheets 3 are pressed against one another at the spot weld by electrodes 1, and a high current flows pointwise between the electrodes through sheets 3.

In order to protect electrodes 1 and/or the electrode caps provided in the tip area (which are conventional of themselves) against surface damage, each electrode 1 or electrode cap 4 has a foil section 5 associated with it, said section abutting in particular the tip of electrode cap 4 as well as the lateral areas of electrode cap 4 that are opposite one another. Each foil section 5 is thus located between the respective electrode 1 and/or its electrode cap 4 as well as sheets 3, and protects the associated electrode cap 4 against damage, especially against pickup of aluminum.

Each foil section 5 is part of a foil strip 10 that can be unrolled from a coil 9a, and taken up on a coil 9b. Each coil 9b can have a suitable drive mechanism. When foil section 5 currently located against electrode cap wears, the drive mechanism advances foil strip 10 between two welding processes by a certain amount or distance, so that a new foil section 5 abuts electrode cap 4. This advance as described above however operates satisfactorily only if foil section 5 does not stick to electrode cap 4 during welding. Of course, in order to achieve optimum spot weld quality, there should not be any adhesion between foil section 5 and sheets 3 either.

In order to prevent such sticking or adhesion, foil section 5 is made of a material with a high nickel content while silver or a silver metal oxide is provided as the material in the contact area between electrode cap 4 and the foil section. For this purpose an electrode cap of a conventional type, made of a suitable copper alloy, is coated with silver or with a silver metal oxide; or alternatively, it can have an insert made of these materials which comes in contact with the foil section during welding. With this combination of materials (i.e., aluminum and nickel on the side facing aluminum sheet 3 and silver and nickel on the side facing electrode cap 4) up to 10,000 spot welds were made in a series of tests with a wide variety of conventional aluminum sheets 3, and optimum welding results were achieved every time. In other words no adhesion effects of any kind were observed.

In a comparison test with a bare copper electrode and a simple foil strip that was not coated according to the invention, only 800 unobjectionable spot welds could be made. In addition, in another comparison tests using bare copper electrodes for welding aluminum sheets from which the oxide layer had been removed, only 300 spot welds could be made without a foil strip in between. Finally, when aluminum sheets with an oxide layer on them were welded, only 40 spot welds could be produced that were unobjectionable, without using a foil strip.

As already explained, foil section 5 is preferably a component of foil strip 10 made of nickel or a suitable nickel alloy. Nickel or nickel alloys with a high nickel content are especially suitable for this purpose because foils or foil strips 10 can be made especially readily from these materials. An example of a material with a high nickel content for foil strip 10 could be a nickel alloy with at least essentially 50% nickel content, but also constantan, or Cuni 44, which also has a sufficiently high nickel content. Optimally suited foil strips 10 can be produced both by using the latter and by using pure nickel, said strips preferably having a thickness in the range from 0.02 mm to 0.05 mm.

As already mentioned, conventional materials should be used for the electrode cap, i.e. basically copper alloys such as copper-chromium-zirconium, as well as CuAg. However, no adhesion effects were observed between foil section 5 and electrode cap 4, even after 10,000 spot welds, only if silver was the predominant material in these contact areas between electrode cap 4 and foil section 5. This is feasible if electrode cap 4 is coated with silver or a silver metal oxide on the surface facing foil section 5 or has a suitable insert made of these materials.

Pure silver can be used as the silver material but it may be too soft for some applications. Therefore, suitable silver metal oxides that also have a high silver content may be used. Such silver metal oxides are known from the electrical contact industry. There is also the possibility of a so-called hard silver coating of the type used for example in tableware.

It is always important to make certain that the electrical resistance that is present is as low as possible and that there is no increase in resistance as a result of oxidation processes (which are usually unavoidable) which would result in a temperature increase and hence lead to the abovementioned adhesion effects. Furthermore, the silver material that is used should be marked by high thermal conductivity and sufficient thermal hardness. It is then possible to achieve optimum welding results, with other material combinations being possible for a significantly smaller number of spot welds, while the number of spot welds that is required for mass production can only be achieved by the abovementioned combinations of materials. This can be explained by the different metallurgical and physical effects that occur in the welding zone during the welding process because of the extremely high currents that are conducted there. It has been found that comparatively good results can also be achieved with sheets or shapes to be welded that are made of the other materials recited at the outset.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for resistance spot welding of a conductive material, comprising:

first and second electrodes having respective electrode caps disposed opposite each other to form a gap for receiving said conductive material; and a foil section disposed across at least one of said electrode caps, said foil section being displaceable relative said electrode cap, wherein said foil section comprises a material with a high nickel content; and said electrode cap comprises a copper alloy material which is coated with a material selected from the group consisting of silver and silver oxides.

2. The device according to claim 1, wherein said conductive material comprises a material selected from the group consisting of aluminum, magnesium and copper, which is formed into one of sheets and shapes.

3. The device according to claim 1, wherein the nickel content of the foil section is at least 50%.

4. The device according to claim 1, wherein the foil section is made of constantan.

5. The device according to claim 1, wherein the foil section is part of a foil strip that has a thickness in the range from 0.02 mm to 0.05 mm.

6. A device for resistance spot welding of a conductive material, comprising:

first and second electrodes having respective electrode caps disposed opposite each other to form a gap for receiving said conductive material; and a foil section disposed across at least one of said electrode caps, said foil section being displaceable relative said electrode cap, wherein said foil section comprises a material with a high nickel content; and said electrode cap has an insert for contacting the foil section, which insert is made of a material selected from the group consisting of silver and silver metal oxides.

7. The device according to claim 6, wherein said conductive material comprises a material selected from the group consisting of aluminum, magnesium and cooper, which is formed into one of sheets and shapes.

8. The device according to claim 6, wherein the nickel content of the foil section is at least 50%.

9. The device according to claim 6, wherein foil section is made of constantan.

10. The device according to claim 6, wherein foil section is part of a foil strip that has a thickness in the range from 0.02 mm to 0.05 mm.

11. A method of resistance spot welding of a conductive material using a welding device comprising first and second electrodes having respective electrode caps which are disposed opposite each other to form a gap for receiving said conductive material, said method comprising:

displaceably positioning a foil section across at least one of said electrode caps for contacting a conductive material to be spot welded, said foil section comprising a material with a high nickel content; and providing said electrode cap in the form of a copper alloy material which is coated with a material selected from the group consisting of silver and silver oxides.

12. A method of resistance spot welding of a conductive material using a welding device comprising first and second electrodes having respective electrode caps which are disposed opposite each other to form a gap for receiving said conductive material, said method comprising:

displaceably positioning a foil section across at least one of said electrode caps for contacting a conductive material to be spot welded, said foil section comprising a material with a high nickel content; and providing said electrode cap with an insert for contacting the foil section, said insert being made of a material selected from the group consisting of silver and silver metal oxides.

* * * * *